US009007622B2

(12) United States Patent
Refstrup

(10) Patent No.: US 9,007,622 B2
(45) Date of Patent: Apr. 14, 2015

(54) REPLACEABLE PRINTER COMPONENT INCLUDING A MEMORY UPDATED ATOMICALLY

(75) Inventor: Jacob Grundtvig Refstrup, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1046 days.

(21) Appl. No.: 12/994,255

(22) PCT Filed: May 29, 2008

(86) PCT No.: PCT/US2008/065100

§ 371 (c)(1),
(2), (4) Date: Nov. 23, 2010

(87) PCT Pub. No.: WO2009/145772

PCT Pub. Date: Dec. 3, 2009

(65) Prior Publication Data

US 2011/0134479 A1 Jun. 9, 2011

(51) Int. Cl.

*G06F 3/12* (2006.01)
*G03G 21/18* (2006.01)
*B41J 2/175* (2006.01)
*G03G 15/08* (2006.01)

(52) U.S. Cl.

CPC ......... *G03G 21/1882* (2013.01); *B41J 2/17546* (2013.01); *G03G 2215/0697* (2013.01); *G03G 2221/1823* (2013.01); *G03G 15/0891* (2013.01); *G03G 15/0865* (2013.01); *G03G 15/0855* (2013.01); *Y10S 707/99938* (2013.01); *Y10S 707/99953* (2013.01); *Y10S 707/99952* (2013.01)

(58) Field of Classification Search

None
See application file for complete search history.

(56) References Cited

U.S. PATENT DOCUMENTS

| | | | | |
|---|---|---|---|---|
| 4,961,088 A * | 10/1990 | Gilliland et al. | ................ | 399/25 |
| 5,610,635 A | 3/1997 | Murray et al. | | |
| 5,699,091 A * | 12/1997 | Bullock et al. | .................. | 347/19 |
| 5,812,156 A | 9/1998 | Bullock et al. | | |
| 5,835,817 A | 11/1998 | Bullock et al. | | |
| 5,930,553 A * | 7/1999 | Hirst et al. | ........................ | 399/8 |
| 6,019,461 A | 2/2000 | Yoshimura et al. | | |
| 6,039,430 A * | 3/2000 | Helterline et al. | .............. | 347/19 |
| 6,126,265 A | 10/2000 | Childers et al. | | |
| 6,239,879 B1 * | 5/2001 | Hay | ............................ | 358/1.15 |

(Continued)

FOREIGN PATENT DOCUMENTS

| | | |
|---|---|---|
| CN | 1289966 A | 4/2001 |
| CN | 1482000 A | 3/2004 |

(Continued)

*Primary Examiner* — Paul F Payer
(74) *Attorney, Agent, or Firm* — Dicke, Billig & CZAJA, PLLC

(57) ABSTRACT

A replaceable printer component includes a memory device and a communication link. The memory device includes a memory and a circuit configured to atomically update data stored in the memory. The communication link is configured to communicatively link the memory device to a printer controller when the replaceable printer component is installed in a printing system. The circuit is configured to receive a write request including data, a data length, and an address from the printer controller; copy the data length of data stored at the address to a backup area of the memory; store the data length and the address in the memory; set a write state stored in the memory to a first state; update the data length of data stored at the address with the received data; and set the write state stored in the memory to a second state.

20 Claims, 3 Drawing Sheets

(56) References Cited

U.S. PATENT DOCUMENTS

| | | | | |
|---|---|---|---|---|
| 6,421,137 | B1 | 7/2002 | Endo | |
| 6,459,860 | B1 | 10/2002 | Childers | |
| 6,480,935 | B1 * | 11/2002 | Carper et al. | 711/115 |
| 6,738,903 | B1 | 5/2004 | Haines | |
| 6,817,693 | B2 | 11/2004 | Phillips et al. | |
| 7,043,623 | B2 * | 5/2006 | Chen et al. | 711/219 |
| 7,234,792 | B2 | 6/2007 | Forman | |
| 7,254,592 | B1 * | 8/2007 | Matero | 1/1 |
| 7,620,660 | B2 * | 11/2009 | Kodavalla et al. | 1/1 |
| 7,971,022 | B2 * | 6/2011 | Kim et al. | 711/170 |
| 2002/0060703 | A1 * | 5/2002 | Tsukada | 347/5 |
| 2004/0080775 | A1 * | 4/2004 | Owen et al. | 358/1.14 |
| 2004/0090832 | A1 | 5/2004 | Asauchi | |
| 2005/0212847 | A1 | 9/2005 | Tsuji | |
| 2005/0216530 | A1 | 9/2005 | Meller et al. | |
| 2007/0211291 | A1 | 9/2007 | Walmsley | |
| 2009/0313501 | A1 * | 12/2009 | Hallivuori | 714/15 |

FOREIGN PATENT DOCUMENTS

| | | | |
|---|---|---|---|
| CN | 1677571 | A | 10/2005 |
| KR | 10-2002-0018156 | | 3/2002 |
| KR | 10-2003-0072612 | | 9/2003 |
| WO | 2006-138407 | A1 | 12/2006 |

* cited by examiner

REPLACEABLE PRINTER COMPONENT INCLUDING A MEMORY UPDATED ATOMICALLY

RELATED APPLICATIONS

The present application claims the priority under 35 U.S.C. 119(a)-(d) or (f) and under C.F.R. 1.55(a) of previous International Patent Application No.: PCT/US2008/065100, filed May 29, 2008, entitled "Replaceable Printer Component Including a Memory Updated Atomically", which application is incorporated herein by reference in its entirety.

BACKGROUND

Current printing systems typically include one or more replaceable printer components, such as inkjet cartridges, inkjet printhead assemblies, toner cartridges, ink supplies, etc. Some existing systems provide these replaceable printer components with on-board memory to communicate information to a printer about the replaceable component, such as ink fill level, marketing information, etc.

A printer in which a replaceable printer component is installed may be turned off at any time. If the printer is turned off while data is being written to the on-board memory of the replaceable printer component, the data stored in the on-board memory may be corrupted. For these and other reasons, a need exists for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
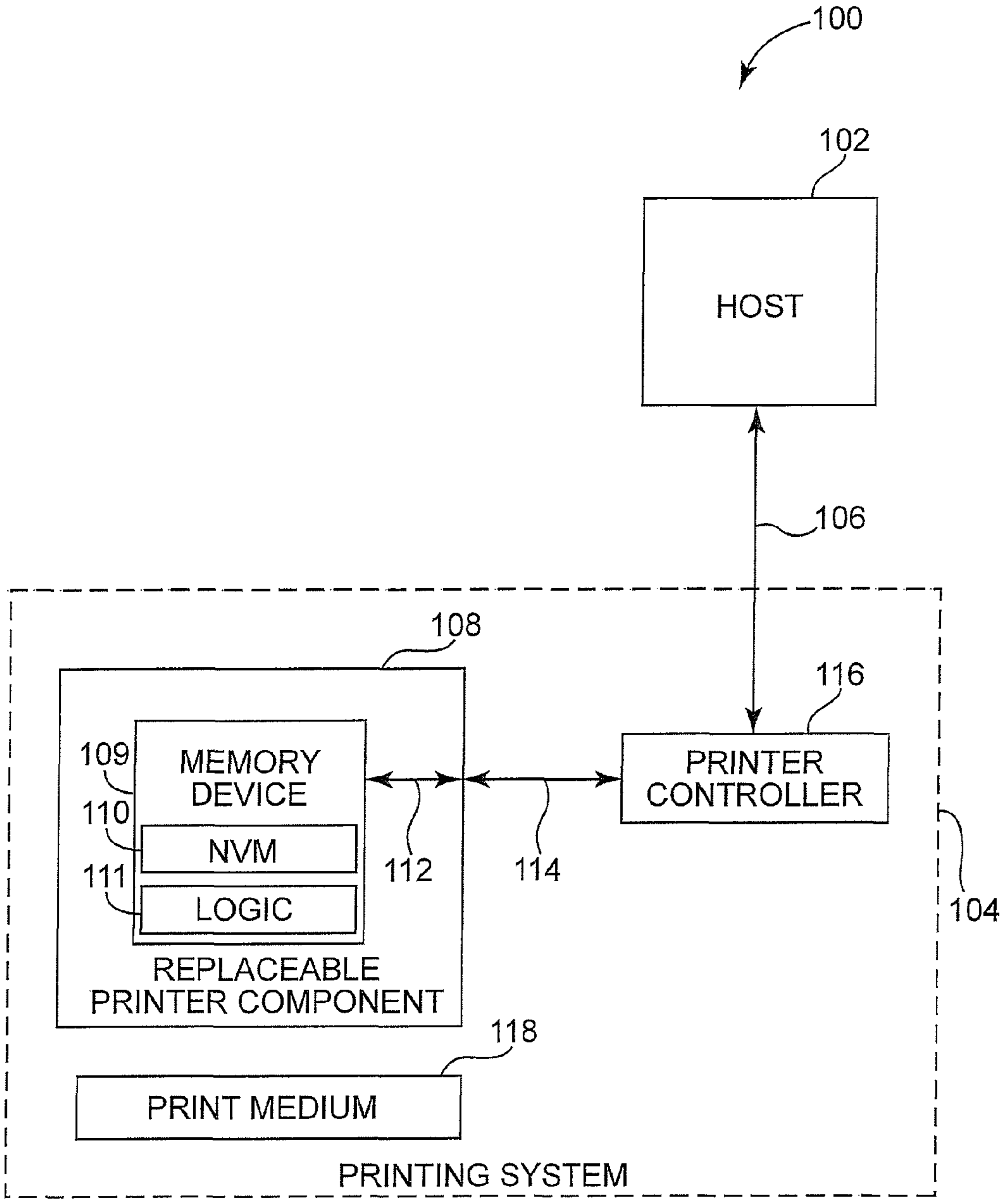
FIG. 1 is a block diagram illustrating one embodiment of a printing arrangement.

FIG. 1 is a block diagram illustrating one embodiment of a printing arrangement 100. Printing arrangement 100 includes a host 102 and a printing system 104. Printing system 104 facilitates printing of graphical and/or textural images on a print medium 118, such as paper, card stock, transparencies, Mylar, cloth, and the like. Printing system 104 includes, for example, an inkjet printer, a laser printer, or other suitable printer. Host 102 communicates with printing system 104 and provides data and/or control signals to printing system 104. Host 102 can be or can be included in a variety of information sources such as a computer, appliance, or other suitable device such as a personal digital assistant (PDA), digital camera, cellular phone, etc.

In one embodiment, printing system 104 includes a printer controller 116 and a replaceable printer component 108. Replaceable printer component 108 includes a memory device 109. In one embodiment, the data stored in memory device 109 is atomically updated in response to a write request from printer controller 116. By atomically updating the data stored in memory device 109, the data in memory device 109 is either updated successfully or remains unchanged. Therefore, even if memory device 109 loses power during a write operation, the data stored within memory device 109 is not corrupted.

Printer controller 116 controls the operation of printing system 104 and, as such, receives data and/or control signals from host 102. Printer controller 116 communicates with host 102 via a communication link 106. Communication link 106 includes, for example, an electrical, optical, infrared, or other suitable information transfer path between printer controller 116 and host 102.

Replaceable printer component 108 includes a component of printing system 104 that is insertable in and removable from printing system 104. In one embodiment, replaceable printer component 108 includes a consumable component that is disposed of and replaced at an end of a useful life thereof. An example of such a consumable component includes an ink container or a toner cartridge that contains a supply of marking material for printing system 104. The marking material is deposited on print medium 118 by printing system 104 and depleted during a useful life of the ink container or toner cartridge. As such, the ink container or toner cartridge is disposed of and replaced at an end of a useful life thereof or is remanufactured and reused.

In another embodiment, replaceable printer component 108 includes a printing component that is readily replaced in printing system 104. Examples of such a printing component include a printhead that selectively deposits ink on print medium 118 in response to control signals from printer controller 116 or a printer cartridge that includes a printhead and an ink supply. Thus, replaceable printer component 108 may include an ink container, a printhead, or a printer cartridge if, for example, printing system 104 includes an inkjet printer. In addition, replaceable printer component 108 may include a toner cartridge or a developer drum if, for example, printing system 104 includes a laser printer. Further, replaceable printer component 108 may include a peripheral device of printing system 104, such as an Ethernet card, a duplexer, a paper finisher (e.g., stapler, hole punch, etc.), or another suitable device.

Printer controller 116 and replaceable printer component 108 communicate with each other via a communication link 114. Communication link 114 facilitates information transfer between printer controller 116 and replaceable printer component 108 when replaceable printer component 108 is installed in printing system 104. Communication link 114 includes, for example, an electrical, optical, infrared, or other suitable information transfer path between replaceable printer component 108 and printer controller 116.

Replaceable printer component 108 includes a memory device 109 that stores information for replaceable printer component 108 and/or printing system 104. Memory device 109 includes a non-volatile memory (NVM) 110 and logic 111. In one embodiment, logic 111 is a logic circuit or embedded software running on a processor. In one embodiment, non-volatile memory 110 is a 256-byte or another suitably sized non-volatile memory, such as an EEPROM, a FLASH, or another suitable memory. In one embodiment, non-volatile memory 110 of memory device 109 stores, for example, information that is specific to replaceable printer component 108 and/or information that is applicable to printing system 104. In addition, non-volatile memory 110 can have information to be used by printing system 104 stored therein or can record information for printing system 104. In one embodiment, information that may be stored in non-volatile memory 110 includes operational and/or non-operational parameters for replaceable printer component 108 and/or printing system 104.

In one embodiment, replaceable printer component 108 includes a communication link 112 that electrically couples or communicatively couples memory device 109 with communication link 114 and, therefore, with printer controller 116 when replaceable printer component 108 is installed in printing system 104. As such, when replaceable printer component 108 is installed in printing system 104, memory device 109 communicates with printer controller 116 via communication links 112 and 114. Thus, communication links 112 and 114 include, for example, electrical couplings or connections such as electrical contacts or pins that mate with corresponding electrical nodes or receptacles, respectively.

With replaceable printer component 108 installed in printing system 104, printer controller 116 communicates with memory device 109 through communication links 112 and 114. Logic circuit 111 of memory device 109 atomically updates data stored in non-volatile memory 110 in response to a write request from printer controller 116. In one embodiment, the write request includes an address, data, and a data length indicating the length of the data to be stored at the address. Logic circuit 111 independently from printer controller 116 ensures that the write request is either completed successfully or fails such that the data stored in non-volatile memory 110 is not corrupted. If memory device 109 loses power at any time during the updating of data stored in non-volatile memory 110, logic circuit 111 returns the data stored in non-volatile memory 110 to its pre-write request state upon power up of memory device 109.

Portions of non-volatile memory 110 are reserved for storing information used to perform the atomic updates. The reserved portions store a write state (WRITE_STATE) value, a write address (WRITE_ADDR) value, a write length (WRITE_LEN) value, and write backup (WRITE_BACKUP) data. The write state value stores a first state (WRITING_UPDATE) if an atomic update is in progress and stores a second state (DONE) if an atomic update is not in progress. The write address value stores the address received in a write request. The write length value stores the data length received in a write request. In one embodiment, the data length is up to 64-bytes. The write backup data stores a backup copy of the data stored in non-volatile memory 110 at the address that is to be updated in response to a write request. In one embodiment, the write backup area of non-volatile memory 110 is up to 64-bytes.

In another embodiment, the write backup area is set to twice the size of a page of non-volatile memory 110 and the maximum length (LEN) of the data to be updated is set to the size of a page (PAGE_SIZE) of non-volatile memory 110. In one embodiment, writing to non-volatile memory 110 involves erasing a page by setting all the bits to logic "1" and then selectively programming the bits that should be logic "0". For example, for a page size of 64-bytes where 40-bytes are to be written at address (ADDR) 30, two pages are first erased before the data is written. Therefore, the write backup area of non-volatile memory 110 is two pages in this embodiment.

The write backup address (backup_addr), which is used in place of the ADDR value in this embodiment, and length (backup_len), which is used in place of the LEN value in this embodiment, are calculated as follows:

```
Let << be left shift and let >> be right shift.
Let PAGE_SIZE be defined as (1 << PAGE_SIZE_BITS)
(e.g., for PAGE_SIZE = 64, PAGE_SIZE_BITS = 6).
Let page_start = ADDR >> PAGE_SIZE_BITS.
Let page_end = (ADDR + LEN - 1) >> PAGE_SIZE_BITS.
If page_start == page_end then
// backup a single page
backup_addr = page_start << PAGE_SIZE_BITS
backup_len = PAGE_SIZE
else
// backup two pages
backup_addr = page_start << PAGE_SIZE_BITS
backup_len = 2 * PAGE_SIZE
endif
```

Therefore, any write up to the page size irrespective of alignment and the start address is atomic.

Figure 2:
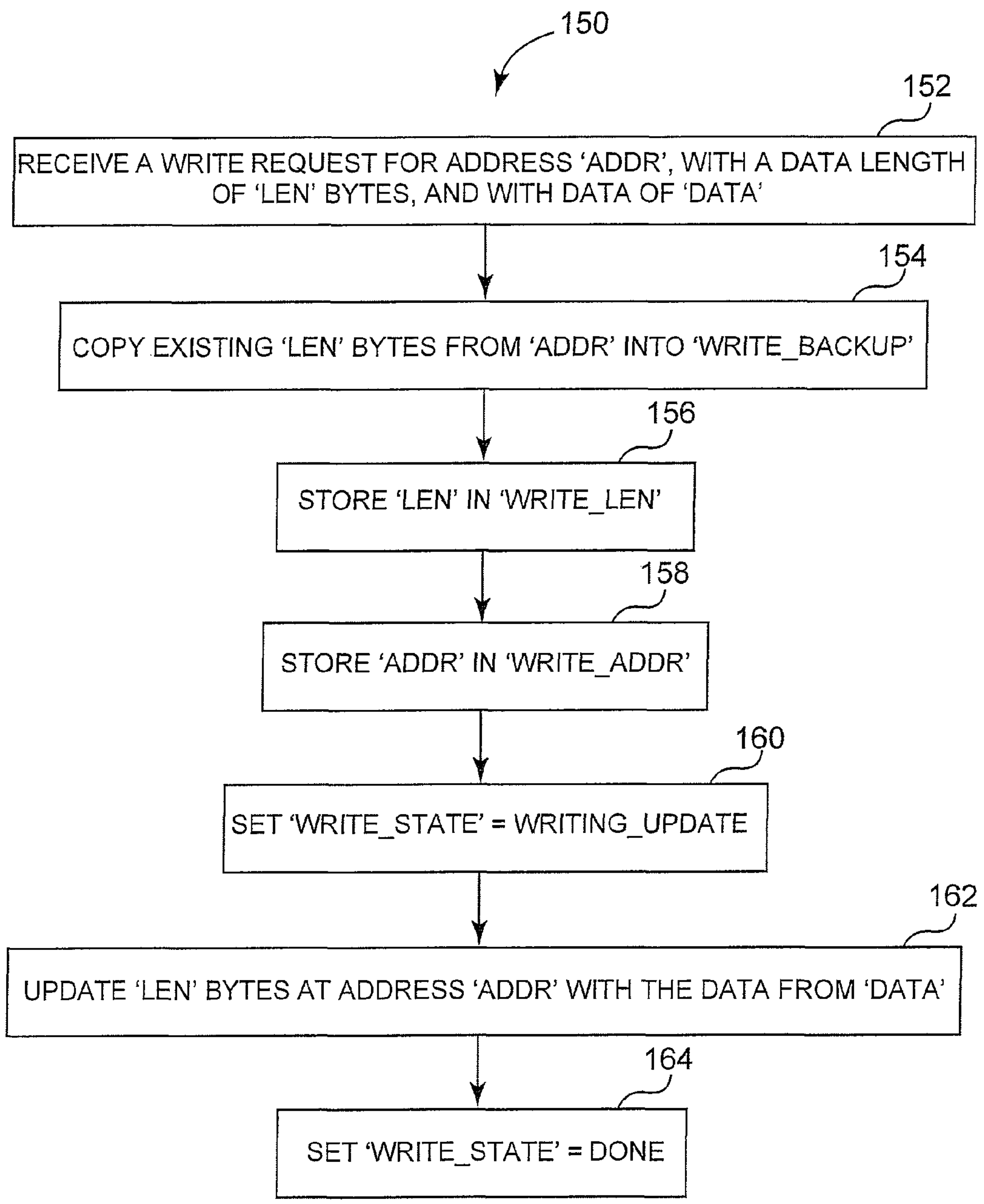
FIG. 2 is a flow diagram illustrating one embodiment of a method for atomically updating data stored in a memory of a replaceable printer component.

FIG. 2 is a flow diagram illustrating one embodiment of a method 150 for atomically updating data stored in a non-volatile memory 110 of a memory device 109 of a replaceable printer component 108. At 152, logic circuit 111 of memory device 109 receives a write request from printer controller 116 to update data stored in non-volatile memory 110. The write request includes an address (ADDR) of non-volatile memory 110, a data length (LEN) indicating the length of the data to be updated, and the data (DATA) to be written to the address. In one embodiment, the data length is provided in bytes.

At 154, in response to the write request, logic circuit 111 copies the received data length (LEN) of data currently stored in non-volatile memory 110 at the received address (ADDR) to the write backup (WRITE_BACKUP) data area of non-volatile memory 110. At 156, logic circuit 111 writes the received data length (LEN) to the write length (WRITE_LEN) value stored in non-volatile memory 110. At 158, logic circuit 111 writes the received address (ADDR) to the write address (WRITE_ADDR) value stored in non-volatile memory 110.

At 160, logic circuit 111 sets the write state (WRITE_STATE) value stored in non-volatile memory 110 to the first state (WRITING_UPDATE). In one embodiment, logic circuit 111 uses a suitable error detection scheme or code when storing the write state such that a corrupted write state value can be detected. In another embodiment, the write state is encoded using a forward error correction scheme or code.

For example, in one embodiment, the write state is stored with a cyclic redundancy check (CRC). At 162, logic circuit 111 updates the received data length (LEN) of data stored at the received address (ADDR) in non-volatile memory 110 with the received data (DATA). At 164, logic circuit 111 sets the write state (WRITE_STATE) value stored in non-volatile memory 110 to the second state (DONE) indicating that the requested write operation completed successfully.

Printing system 104 may be turned off at any time during the write operation described above. If printing system 104 is turned off at any time during the write operation, replaceable printer component 108 and therefore memory device 109 loses power and the write operation is interrupted. If the write operation is interrupted, the state of the data stored in non-volatile memory 110 is unknown. To prevent the data stored in non-volatile memory 110 from remaining in an unknown state, upon power up of memory device 109, logic circuit 111 determines whether a write operation was interrupted. Logic circuit 111 then acts accordingly based on the determination as described below with reference to FIG. 3.

Figure 3:
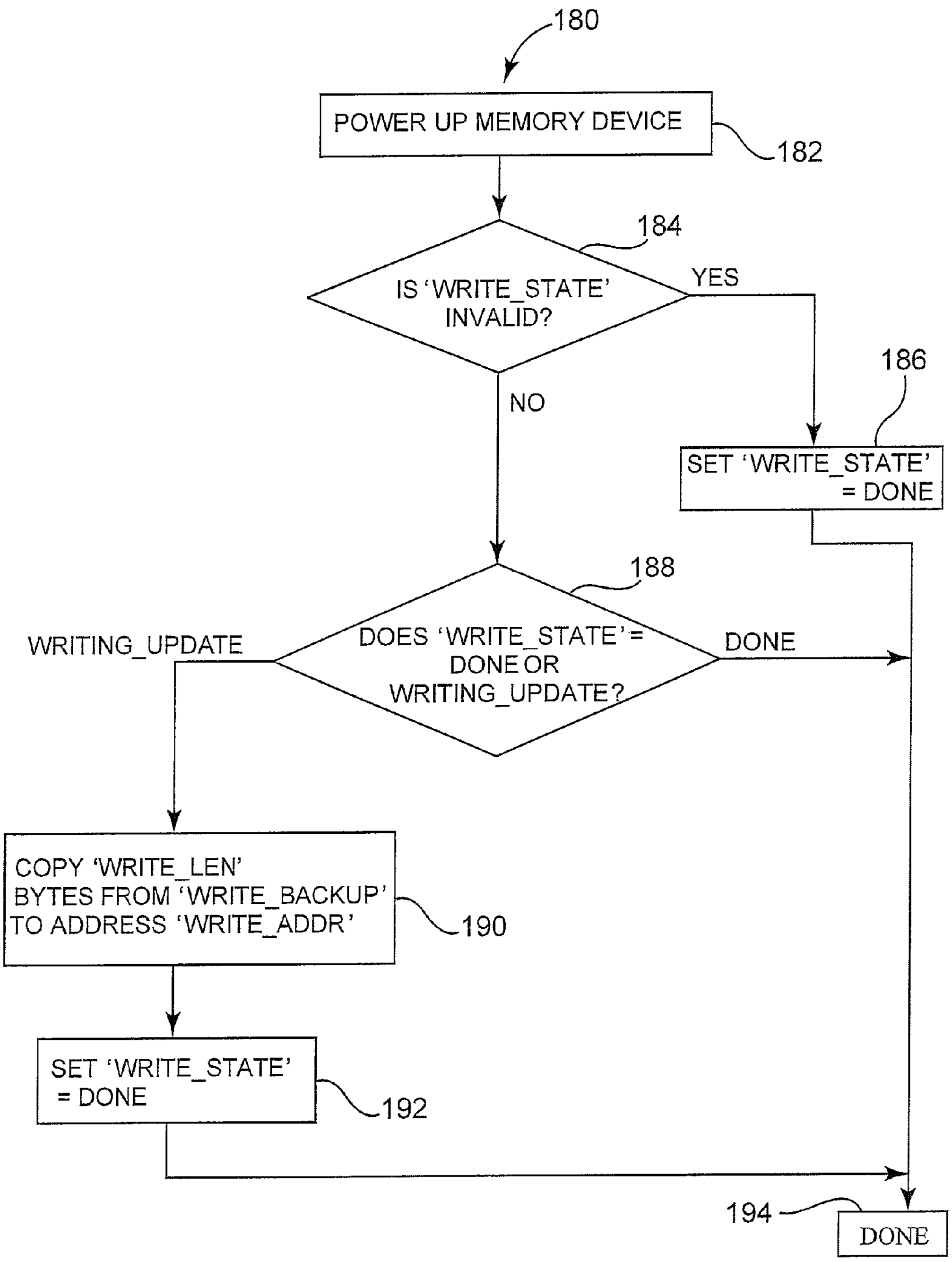
FIG. 3 is a flow diagram illustrating one embodiment of a method for checking a memory of a replaceable printer component upon power up.

FIG. 3 is a flow diagram illustrating one embodiment of a method 180 for checking a non-volatile memory 110 of a memory device 109 of a replaceable printer component 108 upon power up. At 182, replaceable printer component 108 and thus memory device 109 is powered up in response to printing system 104 being turned on. At 184, in response to being powered up, logic circuit 111 reads the write state (WRITE_STATE) value stored in non-volatile memory 110. Logic circuit 111 determines whether the write state value is valid based on the error detection scheme or code used when the write state value was stored in non-volatile memory 110. If the write state value is invalid, then at 186, logic circuit 111 sets the write state (WRITE_STATE) value stored in non-volatile memory 110 to the second state (DONE). The power up sequence for memory device 109 is then done at 194.

If the write state value is valid, then at 188 logic circuit 111 determines whether the write state value is set to the first state (WRITING_UPDATE) or the second state (DONE). If the write state value is set to the second state (DONE), then the power up sequence for memory device 109 is done at 194. If the write state value is set to the first state (WRITING_UPDATE), then at 190 logic circuit 111 reads the write length (WRITE_LEN) value and the write address (WRITE_ADDR) value stored in non-volatile memory 110. Logic circuit 111 copies the write length value of data stored in the write backup (WRITE_BACKUP) data area of non-volatile memory 110 to the write address. Therefore, the data stored at the write address is restored to its pre-write request state. At 192, logic circuit 111 sets the write state (WRITE_STATE) value stored in non-volatile memory 110 to the second state (DONE). The power up sequence for memory device 109 is then done at 194.

Embodiments provide a replaceable printer component including a memory device. Memory device embodiments include a memory and a logic circuit to atomically update data stored in the memory in response to a write request. The logic circuit ensures that a requested write operation is either completed successfully or that the state of the data stored in the memory is maintained or returned to its pre-write request state. Therefore, if memory device embodiments lose power during a write operation, the data stored in the memory does not become corrupted.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A replaceable printer component comprising:
- a memory device including a memory and a circuit configured to atomically update data stored in the memory; and
- a communication link configured to communicatively link the memory device to a printer controller when the replaceable printer component is installed in a printing system,
- wherein the circuit is configured to:
  - receive a write request including data, a data length, and an address from the printer controller;
  - copy the data stored at the address to a backup area of the memory;
  - store the data length and the address in the memory;
  - set a write state stored in the memory to a first state;
  - update the data length of data stored at the address with the received data;
  - determine whether the write state is valid; and
  - set the write state to a second state when the write state is invalid.

2. The replaceable printer component of claim 1, wherein the circuit is configured to:
- read the write state stored in the memory in response to powering up the memory device;
- read the stored data length and the stored address from the memory; and
- copy the data length of data stored in the backup area of the memory to the address in response to the write state being set to the first state.

3. The replaceable printer component of claim 1, wherein the circuit is configured to encode the write state stored in the memory using an error detection or correction scheme.

4. The replaceable printer component of claim 1, wherein the circuit is configured to receive a write request including a data length of up to a size of a page of the memory.

5. The replaceable printer component of claim 4, wherein the backup area of the memory has a length of twice the size of a page of the memory.

6. The replaceable printer component of claim 1, wherein the replaceable printer component comprises one of an inkjet cartridge, an inkjet printhead assembly, a toner cartridge, and an ink supply.

7. The replaceable printer component of claim 1, wherein the replaceable printer component comprises a peripheral device of the printing system.

8. The replaceable printer component of claim 1, wherein the circuit is configured to receive a write request including a data length of up to 64-bytes.

9. The replaceable printer component of claim 1, wherein the memory comprises a non-volatile memory.

10. The replaceable printer component of claim 1, wherein the replaceable printer component comprises a developer drum.

11. A replaceable printer component comprising:
- a memory device including a memory and a circuit configured to atomically update data stored in the memory; and
- a communication link configured to communicatively link the memory device to a printer controller when the replaceable printer component is installed in a printing system,
- wherein the circuit is configured to:
  - receive a write request including data, a data length, and an address from the printer controller;

copy the data length of data stored at the address to a backup area of the memory;

store the data length and the address in the memory;

set a write state stored in the memory to a first state;

update the data length of data stored at the address with the received data;

and set the write state stored in the memory to a second state;

wherein the circuit is further configured to:

encode the write state stored in the memory using an error detection or correction scheme;

read the write state stored in the memory in response to powering up the memory device;

determine whether the write state is valid based on the error detection or correction scheme; and set the write state stored in the memory to the second state in response to determining that the write state is invalid.

12. The replaceable printer component of claim 11, wherein the circuit is configured to:

read the write state stored in the memory in response to powering up the memory device;

read the stored data length and the stored address from the memory; and copy the data length of data stored in the backup area of the memory to the address in response to the write state being set to the first state.

13. The replaceable printer component of claim 11, wherein the circuit is configured to receive a write request including a data length of less than and up to a size of a page of the memory.

14. The replaceable printer component of claim 13, wherein the backup area of the memory has a length of twice the size of a page of the memory.

15. The replaceable printer component of claim 13, wherein the circuit is further configured to calculate a write backup address and backup length such that any write request for data less than a size of page is atomic irrespective of alignment and start address.

16. The replaceable printer component of claim 11, wherein the replaceable printer component comprises one of an inkjet cartridge, an inkjet printhead assembly, a toner cartridge, an ink supply, and a peripheral device of the printing system.

17. A method of storing data atomically on a replaceable printer component comprising a memory device including a memory and a circuit configured to atomically update data stored in the memory; and a communication link configured to communicatively link the memory device to a printer controller when the replaceable printer component is installed in a printing system, wherein the method comprises:

receiving a write request including data, a data length, and an address from the printer controller;

copying the data stored at the address to a backup area of the memory;

storing the data length and the address in the memory;

setting a write state stored in the memory to a first state which indicates that the received data from the write request has not yet been successfully written to the address;

updating the data length of data stored at the address with the received data;

encoding the write state stored in the memory using an error detection or correction scheme;

reading the write state stored in the memory in response to powering up the memory device;

determining whether the write state is valid based on the error detection or correction scheme; and, then, setting the write state stored in the memory to a second state in response to determining that the write state is invalid.

18. The method of claim 17, further comprising:

reading the write state stored in the memory in response to powering up the memory device;

reading the stored data length and the stored address from the memory; and, in response to the write state being set to the first state, copying the data length of data stored in the backup area of the memory to the address.

19. The method of claim 17, wherein the replaceable printer component comprises one of an inkjet cartridge, an inkjet printhead assembly, a toner cartridge, and an ink supply.

20. The method of claim 17, further comprising calculating a write backup address and backup length such that any write request for data less than a size of page is atomic irrespective of alignment and start address.

* * * * *